US011526501B2

(12) United States Patent
Gruszecki et al.

(10) Patent No.: US 11,526,501 B2
(45) Date of Patent: Dec. 13, 2022

(54) MATERIALIZED VIEWS ASSISTANT

(71) Applicant: International Business Machines Corporation, Armonk, NY (US)

(72) Inventors: Artur M. Gruszecki, Cracow (PL); Andrzej Jan Wrobel, Cracow (PL); Tomasz Sekman, Cracow (PL); Tomasz Kazalski, Balice (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/206,211

(22) Filed: Mar. 19, 2021

(65) Prior Publication Data

US 2022/0300491 A1     Sep. 22, 2022

(51) Int. Cl.
*G06F 7/00*     (2006.01)
*G06F 16/23*    (2019.01)
*G06F 16/242*   (2019.01)

(52) U.S. Cl.
CPC ...... *G06F 16/2393* (2019.01); *G06F 16/2433* (2019.01)

(58) Field of Classification Search
CPC ............. G06F 16/2393; G06F 16/2433; G06F 16/24539; G06F 16/2454; G06F 16/24549
See application file for complete search history.

(56) References Cited

U.S. PATENT DOCUMENTS

| 8,464,278 | B2 | 6/2013 | Nesamoney et al. |
| 10,120,899 | B2 | 11/2018 | Ding et al. |
| 10,628,415 | B1 * | 4/2020 | Rajaperumal ....... G06F 16/2393 |
| 11,256,684 | B1 * | 2/2022 | Papakonstantinou ........................ G06F 16/2445 |
| 11,308,079 | B2 * | 4/2022 | Deshpande ....... G06F 16/24568 |
| 2005/0235001 | A1 * | 10/2005 | Peleg .................. G06F 16/2393 |
| 2005/0235004 | A1 * | 10/2005 | Folkert .............. G06F 16/2393 |
| 2017/0031976 | A1 * | 2/2017 | Chavan .............. G06F 16/2255 |
| 2020/0133937 | A1 * | 4/2020 | Cruanes ................. G06F 16/24 |

(Continued)

OTHER PUBLICATIONS

Ordonez-Ante et al., "A Workload Driven Approach for View Selection in Large Dimensional Datasets", Journal of Network and Systems Management, Accepted: Mar. 10, 2020, © Springer Science+Business Media, LLC, part of Springer Nature 2020, 26 pages.

(Continued)

*Primary Examiner* — Mohammed R Uddin
(74) *Attorney, Agent, or Firm* — Jeffrey M. Ingalls (57) ABSTRACT

The present disclosure relates to a method comprising incorporating a utilization level field for a set of materialized views of database system in a database catalog of the database system. A computer process may be generated to run during a defined time period on a spare host of the database system. The computer process is configured to monitor utilization of the set of materialized views and to collect data of utilized materialized views in a dedicated registry. A check if each materialized view of the set of materialized views is present in the registry may be periodically be performed. The utilization level of a materialized view may be adapted based on its collected data in the registry. A check in catalog utilization levels of the set of materialized views may periodically be performed and based on the utilization levels utilization of the set of materialized views may be adapted.

20 Claims, 5 Drawing Sheets

(56) References Cited

U.S. PATENT DOCUMENTS

| | | | |
|---|---|---|---|
| 2020/0265049 A1* | 8/2020 | da Trindade | G06F 16/24545 |
| 2020/0334241 A1* | 10/2020 | Muralidhar | G06F 3/067 |
| 2021/0165789 A1* | 6/2021 | Deshpande | G06F 11/3495 |
| 2021/0349903 A1* | 11/2021 | Gruszecki | G06F 21/6227 |
| 2022/0083548 A1* | 3/2022 | Thiyagarajan | G06F 16/2358 |
| 2022/0121677 A1* | 4/2022 | Griffith | G06F 16/258 |

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

MATERIALIZED VIEWS ASSISTANT

BACKGROUND

The present disclosure relates to the field of digital computer systems, and more specifically, to a method for a database system comprising a set of materialized views.

During database planning, and later in database tuning, a database administrator may have to react on the performance issues of the database by creating materialized views. The materialized views may improve the overall performance of the database as they may reduce the data access time. Adding a particular materialized view may address one class of the problems. However, the materialized view may also weigh down the system if it is not optimally used.

SUMMARY

In certain embodiments, a computer implemented method for a database system comprising a set of materialized views is provided. The method comprises: incorporating, by one or more processors, a utilization level field for the set of materialized views in a database catalog of the database system; generating, by the one or more processors, a computer process to run during a defined time period on a spare host of the database system, the computer process being configured to monitor utilization of the set of materialized views; executing, by the one or more processors, the computer process comprising: detecting, by the computer process, utilization of at least one materialized view of the set of materialized views; and collecting, by the computer process, data of the detected materialized view in a dedicated registry, the data indicating the detected materialized view and a time of utilization of the materialization view; periodically checking, by the one or more processors, if each materialized view of the set of materialized views is present in the registry; adapting, by the one or more processors, in the utilization level field, the utilization level of a materialized view based on its collected data in the registry; and periodically checking, by the one or more processors, in the catalog utilization levels of the set of materialized views, and based on the utilization levels adapting utilization of the set of materialized views.

In certain embodiments, a computer program product is provided. The computer program product comprises: one or more computer readable storage media, and program instructions collectively stored on the one or more computer readable storage media, the program instructions executable by one or more processors to cause the one or more processors to perform actions comprising: incorporating, by one or more processors, a utilization level field for the set of materialized views in a database catalog of the database system; generating, by the one or more processors, a computer process to run during a defined time period on a spare host of the database system, the computer process being configured to monitor utilization of the set of materialized views; executing, by the one or more processors, the computer process comprising: detecting, by the computer process, utilization of at least one materialized view of the set of materialized views; and collecting, by the computer process, data of the detected materialized view in a dedicated registry, the data indicating the detected materialized view and a time of utilization of the materialization view; periodically checking, by the one or more processors, if each materialized view of the set of materialized views is present in the registry; adapting, by the one or more processors, in the utilization level field, the utilization level of a materialized view based on its collected data in the registry; and periodically checking, by the one or more processors, in the catalog utilization levels of the set of materialized views, and based on the utilization levels adapting utilization of the set of materialized views.

In certain embodiments a computer system (or materialized view assistant) is provided. The system comprises: one or more computer readable storage media with program instructions collectively stored on the one or more computer readable storage media; and one or more processors configured to execute the program instructions to perform a method comprising: incorporating a utilization level field for a set of materialized views of database system in a database catalog of the database system; generating or creating a computer process to run during a defined time period on a spare host of the database system, the computer process being configured to monitor utilization of the set of materialized views, detect utilization of at least one materialized view of the set of materialized views; and collect data of the detected materialized view in a registry, the data indicating the detected materialized view and a time of utilization of the materialization view; periodically checking if each materialized view of the set of materialized views is present in the registry; adapting, in the utilization level field, the utilization level of a materialized view based on its collected data in the registry; and periodically checking in the catalog utilization levels of the set of materialized views, and based on the utilization levels adapting utilization of the set of materialized views.

These and other features and advantages will become apparent from the following detailed description of illustrative embodiments thereof, which is to be read in connection with the accompanying drawings.

It should be noted that the exemplary embodiments are described with reference to different subject-matters. In particular, some embodiments are described with reference to method type claims whereas other embodiments may be described with reference to apparatus, system or computer program product type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus, system or computer program product type claims, is considered as to be described within this document.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

A materialized view of a table may comprise a subset of data of the table. For example, the materialized view may comprise part of the columns of the table. The materialized view may thus reduce the width (number of columns) of data being scanned in a base table by creating a thin version (fewer columns) of the base table that contains a small subset of frequently queried columns. The materialized view may also contain a specific data order. The materialized view may be advantageous because the access to the materialized view may be faster than accessing the corresponding table. This may particularly be advantageous as some queries may only need the data of the materialized view without the remaining data of the table. However, the content of the materialized view may need to be synchronized with the table's content after each change is occurred in the table. This may be resource consuming and may even consume more resources than the resources saved by the usage of the materialized view instead of the table. For example, in case the materialized view is used very seldom, and the table is often modified, the materialized view advantages can be lower in total and may then introduce disadvantages. The present subject matter may solve this issue by regularly monitoring the utilization of the materialized views and based on the monitored utilization, the materialized views are adapted accordingly. This may enable an optimal usage of the materialized views and thus improve performances of the database access.

According to certain embodiments, the utilization level is a number of utilizations, wherein adapting utilization of the set of materialized views comprises: in case the utilization level of a materialized view is smaller than a threshold, disabling the materialized view.

The utilization level may be a scalar or a vector of values or any other type of data that is computer readable and that is indicative of the level of utilization of the materialized view. For example, the utilization level of a materialized view may be a number (e.g., ten), or a vector whose elements are times of utilization of the materialized view (e.g., each element of the vector may have a date format indicating the time at which the materialized view is utilized). The time of utilization of the materialized view may be the time at which the database statement referencing the materialized view is initiated, or it may be the time at which the materialized view is accessed. The access to the materialized view may comprise reading, inserting, updating and/or deleting data from the materialized view.

Disabling a materialized view means that the materialized view is not synchronized with the associated table. The disabling may be performed by, for example, deleting the materialized view or by switching off the maintenance function, wherein the maintenance function is responsible for synchronization between the materialized view and the corresponding table.

According to certain embodiments, the utilization level is a number of utilizations, wherein adapting utilization of the set of materialized views comprises: in case the utilization level of a materialized view is higher than a threshold, maintaining the materialized view.

According to certain embodiments, the utilization level is a frequency of utilizations, wherein adapting utilization of the set of materialized views comprises: determining based on the frequency, time periods during which the materialized view is to be enabled, and enabling the materialized view only for the time periods. For example, the materialized view may be disabled for certain periods and enabled for other periods. After being disabled and before being (re) enabled, the materialized view may be synchronized with the current content of the corresponding table. For example, if a materialized view is only utilized the first day of the month, there is no need to maintain it the whole month. The present solution may enable the materialized view for the first day of the month and disable it for the rest of the month. In the next month, the materialized view may be enabled again in the first day, after being synchronized with the current content of the corresponding table.

According to certain embodiments, adapting the utilization level comprises: increasing the utilization level of a materialized view if it exists in the registry, and if the materialized view is not in the registry decreasing the utilization level of the materialized view. This may enable an automatic and efficient execution of the present method. That is, by merely checking if an entry exits, the utilization levels may be adapted.

According to certain embodiments, the collected data of the detected materialized view further indicates a Structured Query Language (SQL) statement that triggered the utilization of the detected materialized view. The SQL statement may, for example, be used as a key or a subkey of the registry entry associated with the materialized view. This may enable an optimal organization of the registry (e.g., the utilizations associated with the same SQL statement may be collected coherently). This may, for example, speed up the access to the registry because the entries are organized and have a pattern based on SQL statements.

According to certain embodiments, the collected data comprises a hash generated from the SQL statement. This may further improve access to the registry because the hash values provide unique values and enable easy search in the registry.

According to certain embodiments, each materialized view of the set of materialized views is represented by a record in the database catalog, wherein the record comprises values of attributes of the materialized view, the attributes comprising the additional utilization level field.

According to certain embodiments, the computer process is a daemon process. This may enable a continuous monitoring of the utilizations of the materialized views.

According to certain embodiments, the registry is checked more frequently than the catalog.

According to certain embodiments, software or a program implementing at least part of the method described herein is provided as a service in a cloud environment.

Figure 1:
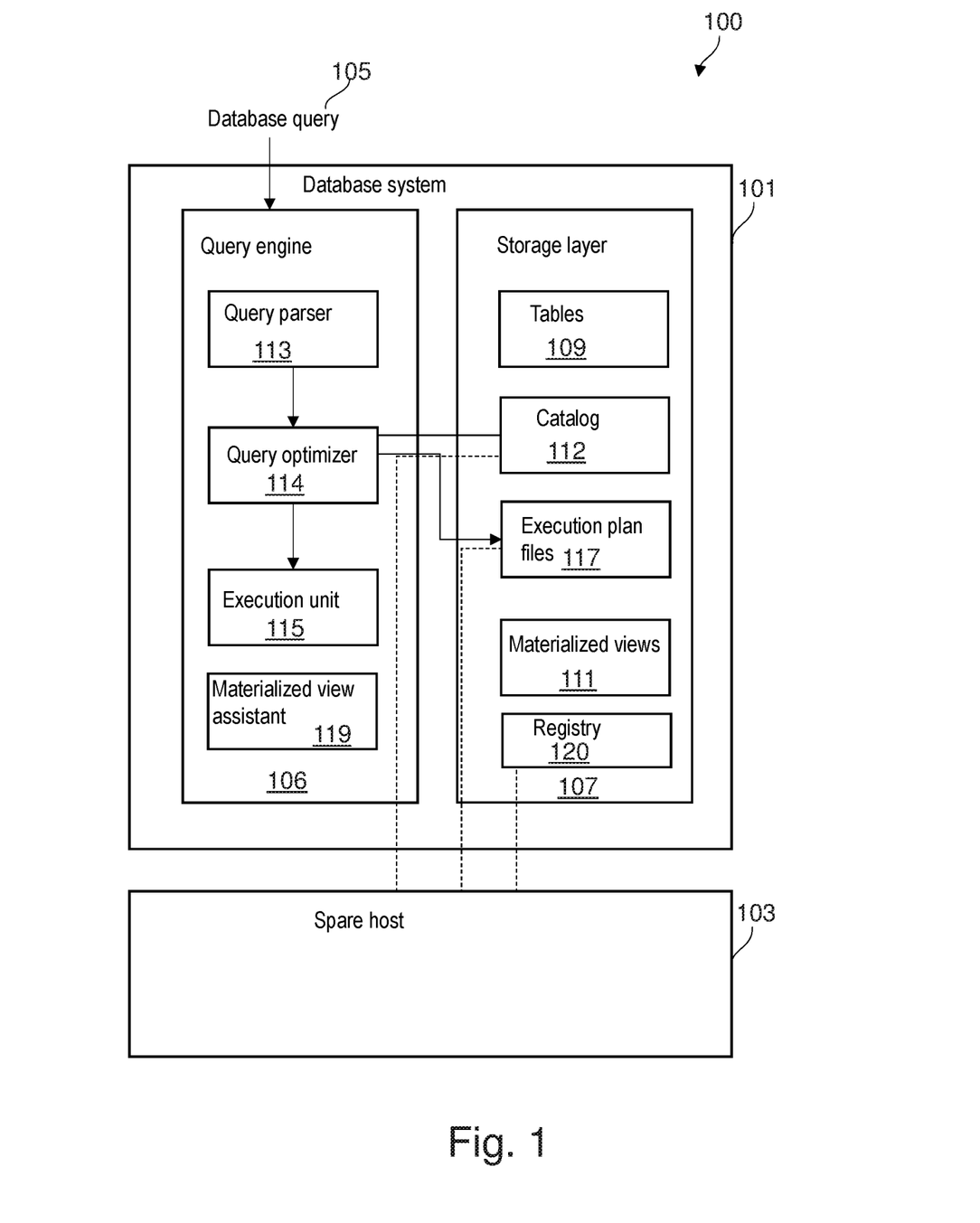
FIG. 1 is a block diagram of a database appliance in accordance with some embodiments.

FIG. 1 illustrates a structure of a database appliance 100 in accordance with certain embodiments. The database appliance 100 may, for example, be a Netezza appliance. As shown in FIG. 1, the database appliance 100 comprises a database system 101. The database system 101 may be referred to as the main host, wherein one or more spare hosts 103 are provided and are standing in readiness to take a workload in case of failover in the main host (or database system 101). The spare host 103 may share the database catalog and cache of execution plans with the main host (or database system 101) and may stand idle almost all the time. As indicated by dashed lines in FIG. 1, the spare host 103 may have, for example, access to the database catalog 112, the registry 120 and the execution plan files 117.

The database system 101 comprises a query engine 106 and a storage layer 107. The storage layer 107 comprise tables 109 and a set of materialized views 111. The storage layer 107 may further comprise the database catalog 112. The database system 101 may collect metadata about data that is stored by the tables 109. Such metadata may be provided as the database catalog 112. Specifically, the database catalog 112 stores information like table names, column names, column types, and some statistical information regarding stored data (number of rows, number of nulls, columns dispersion). Each materialized view of the set of materialized views 111 is associated with a respective table of the tables 109. The materialized view may reduce the width (e.g. number of columns) of data being scanned in a respective base table by creating a thin version (i.e., with fewer columns) of the base table that contains a small subset of frequently queried columns. The materialized view may also contain a specific data order. For example, each table of at least part of the tables 109 may be associated with one or more materialized views. The at least part of the tables may be a subset of the tables 109. In another example, the at least part of the tables may be all tables 109.

A database query 105 may be presented to the database system 101. The database query 105 may be initiated by any conventional source, such as a user, an interactive database query, a call through an application programming interface (API) or a system function. A database query is an instruction to process a data retrieval, manipulation operation, or definition operation on a database. The database query 105 may be defined by one or more database language commands or statements. Database language commands may specify, for instance, a query statement for reading data and/or inserting data into and/or deleting data from and/or updating the database tables 109. An example language for expressing database queries is the Structured Query Language (SQL). The following examples of database queries will use SQL, although the principles of the present subject matter may allow for processing of a database query written in any language.

Database language statements are parsed to determine an execution plan or query plan, which may be the combination of steps used by the database system 101 to execute a database language statement. In operation, received database language statements are processed by query engine 106. The query engine 106 comprises a query parser 113, query optimizer 114 and execution unit 115. The database language statement is passed to the query parser 113, which parses and checks the syntax of the database statement. If the syntax is correct, a query tree is produced, otherwise an error is generated. For example, the database statement may be converted into a query tree which is a tree data structure representing components of the query in a format selected for the convenience of the system. The query optimizer 114 takes the query tree as input and generates an execution plan using metadata from the database catalog 112. The execution plan may be provided as an execution plan file 117. In particular, the query optimizer 114 is responsible for determining the most efficient way to execute the query considering factors affecting execution performance such as, for example, objects referenced, and the conditions specified in the query. For example, the query optimizer 114 may perform a cost-based analysis for formulating a query execution plan. The cost-based analysis may include, for example, selecting the join order of tables to define when the query specifies a join and selecting relevant indexes when available. The execution plan file 117 may, for example, comprise atomic steps, positioned in a strictly calculated order. Also, each execution plan may contain some important information for each step (from optimization perspective) like objects names (e.g. tables, views, and what is used below in the access hierarchy in term of materialized views), predicted costs, used restrictions and projections (columns) The execution unit 115 translates the query execution plan provided by the query optimizer 114 into executable form for execution.

In one example, the query engine 106 may further comprise a martialized view assistant 119. The materialized view assistant 119 may be configured to perform at least part of the present subject matter. Although shown as part of the query engine 106, the materialized view assistant 119 may, in another example, be part of the spare host 103. The database system 101 may further comprise a registry 120 in the storage layer 107. Although shown as part of the storage layer 107, the registry 120 may, in another example, be part of the spare host 103. The spare host 103 may be configured to access the registry 120 (e.g., to add entries in the registry 120).

In one example, the database appliance 100 may be provided in a cloud environment (e.g., the database appliance 100 may be enabled by a cloud infrastructure of cloud-based servers, storage, and network resources accessible through a cloud virtualization technology).

Figure 2:
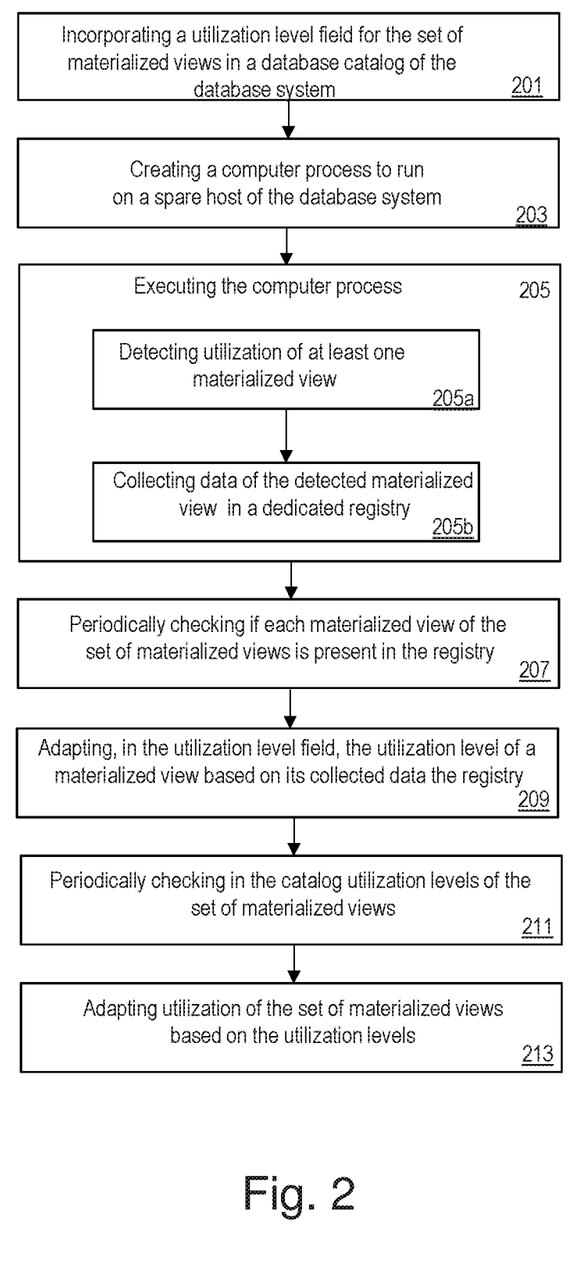
FIG. 2 is a flowchart of a method for using materialized views in accordance with some embodiments.

FIG. 2 is a flowchart of a method in accordance with certain embodiments. The method described in FIG. 2 may be implemented in the system illustrated in FIG. 1, but it is not limited to this implementation.

A utilization level field for the set of materialized views may be incorporated in operation 201 into the database catalog 112. This operation 201 may, for example, be performed by the materialized view assistant 119. The utilization level may, for example, be represented by one scalar or vector of scalars. The utilization level may, for example, be initialized in operation 201 with a predefined value (e.g., zero). For example, each materialized view of the set of materialized views is associated with a row or record of the database catalog 112 that describes the materialized view. Incorporating the utilization field in the database catalog 112 may, for example, comprise adding one column to each of the rows representing the set of materialized views 111, wherein the column may comprise values of the utilization level. The utilization level of a materialized view 111 may indicate the utilization frequency or the number of times or the times the materialized view 111 is utilized. For example, the utilization level of the materialized view 111 may be the number of utilizations and/or the frequency of utilization of the materialized view 111 and/or the times of utilization of the materialized view 111. This may be advantageous because the more information contained in the utilization level the more accurate the adaptation process is.

A computer process may be generated or created in operation 203. In one example, the computer process may be created by the materialized view assistant 119. In one example, the materialized view assistant 119 may be configured to receive the computer process, for example, from a user. In one example, the computer process may be part of the materialized view assistant 119 in the case where the materialized view assistant 119 is part of the spare host 103.

The computer process may be configured to run during a predefined time period on the spare host 103 of the database system 101. The computer process is configured to monitor the utilization of the set of materialized views 111 during the predefined time period. The computer process may, for example, be a daemon process. In one example, the computer process may be configured to continuously monitor the utilization of the set of materialized views 111. This may enable to react in time and provide a real time adaptation of the database system. In another example, the computer process may be configured to monitor the utilization of the set of materialized views 111 in specific time periods e.g. five minutes during every day. This may enable to adapt the database system based on up to date utilization levels while saving processing resources that would otherwise be required by a continuous monitoring of the utilization of the set of materialized views 111.

The computer process may be executed or initiated in operation 205 by the spare host 103. For example, the execution of the computer process may be triggered or initiated by the materialized view assistant. For example, the materialized view assistant 119 may send a control signal to the spare host 103 in order to control the spare host 103 to execute the computer process. The execution of the computer process may comprise operations 205a and 205b. The execution of the computer process may cause the processor of the spare host 103 to check if any of the set of materialized views 111 is utilized. For example, it may be checked if any of the set of materialized views is utilized during a predefined time period. The time period may, for example, be the period between the last execution of operation 205 (last check) and the current execution of operation 205 (current check). In the first execution of operation 205, it may be checked if any of the set of materialized views is utilized from the time of its creation. For example, the computer process may detect in operation 205a that N materialized views are utilized, wherein N≥1. Detecting the utilization of a materialized view may, for example, be performed by detecting that a command such as a SQL statement that is executed references the materialized view (e.g., the command may be for reading, updating, deleting and/or inserting records in the materialized view). For that, the computer process may be configured to monitor all execution plans (e.g. by scanning each execution plan file 117) in order to determine if a materialized view 111 was involved or utilized. In case no materialized view 111 is detected as utilized, the check may be repeated until the detection of utilization of at least one materialized view 111.

In operation 205b, data descriptive of each materialized view of the N materialized views 111 may be collected by the computer process in a registry (e.g., registry 120 shown in FIG. 1). The registry 120 may, for example, be shared between the spare host 103 and the main host (or database system 101) so that both hosts may have access to the registry 120. For example, the data of a detected materialized view 111 may indicate a time of utilization of the materialization view 111. The time of utilization of the materialized view 111 may, for example, be the time of initiation of the command referencing the materialized view 111. The collected time may be advantageous as it may enable definition of the time periods and the frequency of utilization of the materialized view 111. Optionally, the collected data of the detected materialized view 111 may further indicate a SQL statement that triggered the utilization of the detected materialized view 111. This may enable an efficient storage in the registry 120. For example, the materialized view 111 may be provided as a key and the SQL statements referencing the materialized view 111 may be provided as a subkey. This may be advantageous because in case the same SQL statement is detected again, the same registry 120 entry may be used for the collected data of the materialized view 111. For example, the registry 120 may store a hash generated from the SQL statement in an entry of the detected materialized view 111. This may be advantageous as it may provide an efficient way to compare SQL statements.

The computer process may be executed during a first set of time periods. For example, the computer process may be executed in accordance with a first frequency (e.g., five minutes per day). In another example, each period of the first set of time periods may be the same or not the same as another period of the first set of time periods (e.g., the computer process may be executed five minutes in the first day of the week and ten minutes in the second day of the week, etc.). That is, the first set of time periods comprises five minutes of the first day, ten minutes of the second day, etc. This may be advantageous as it may enable an optimally controlled monitoring of the utilization of the materialized views 111 based on workloads in the database system 101 (e.g., if during nights and non-working days the tables are not accessed, then the monitoring may be restricted to the working hours).

Thus, operation 205 may result in the registry 120 being filled with data of materialized views 111 that have been utilized. The registry 120 may be periodically read (e.g., by the materialized view assistant 119) in operation 207 in order to check if each materialized view of the set of materialized views 111 is present in the registry 120. For example, for each materialized view of the set of materialized views 111 it may be checked in operation 207 if an entry is associated with that materialized view 111 in the registry 120. In one example, entries of the registry 120 which are not updated for a predefined minimum time period e.g. one month, may be deleted from the registry 120. This may be advantageous because a simple check of the existence of an entry in the registry 120 may be sufficient to adapt the utilization level of the martialized view 111 (e.g., if an entry does not exist for a materialized view 111, the utilization level may automatically be decreased for that materialized view 111). In another example, entries of the registry 120 may be maintained. This may be advantageous as the content of the entries (e.g., in terms of time) is indicative of the utilization of the materialized view 111 and can be used to reliably adapt the utilization levels.

Based on the collected data in the registry 120 for a given materialized view, the utilization level of the given materialized view 111 may be adapted in operation 209 (e.g., by the materialized view assistant 119). That is, if an entry associated with the given materialized view 111 exists in the registry 120, the collected data stored in that entry may be used to adapt the utilization level of the given materialized view 111 in the database catalog 112. If no entry associated with the given materialized view 111 exists in the registry 120, the utilization level of the given materialized view 111 may be decreased. For example, adapting the utilization level of the given materialized view 111 may be performed by increasing the utilization level of the given materialized view 111 if it exists in the registry 120.

The check in operation 207 may be performed during a second set of time periods. For example, the check of the registry 120 may be performed in accordance with a second frequency (e.g., once per week). The first frequency may be higher than the second frequency, that is, the monitoring is performed by the computer process more frequently than the check of the registry 120.

The database catalog 112 may periodically be read by the materialized view assistant 119 in operation 211 in order to check or determine the utilization levels of the set of materialized views 111. The database catalog 112 may, for example, be checked during a third set of time periods. For example, the check of the database catalog 112 may be performed in accordance with a third frequency (e.g., once per month). The second frequency may be higher than the third frequency, that is, the check of the registry 120 is performed more frequently than the check of the database catalog 112.

Based on the utilization levels of the set of materialized views 111 determined in operation 211, the utilization of the set of materialized views 111 may be adapted in operation 213 by the materialized view assistant 119. By comparing the utilization level of the materialized view 111 with a threshold, it may automatically be determined whether to disable or maintain the materialized view 111. For example, if the utilization level of a materialized view 111 is smaller than a threshold, the materialized view 111 may be disabled (e.g., if the materialized view 111 is not used for a month it may be disabled). Disabling a materialized view 111 may be performed by deleting the materialized view 111 or by disregarding its existence, that is, it is not synchronized with the associated table. If the utilization level of a materialized view 111 is higher than the threshold, the materialized view 111 is maintained.

In one example, an administrator of the database system 101 may be provided with the list of materialized views 111 whose utilization levels are below the threshold (e.g., a mail notice may be sent to the administrator with the list of materialized views 111). An input may be received from the administrator, wherein the input indicates the adaptation of the utilization of the set of materialized views 111 to be performed in operation 213. In one example, the computer process may further be configured to perform operations 207 to 213 (e.g., if the computer process is not part of the martialized view assistant 119.

Figure 3:
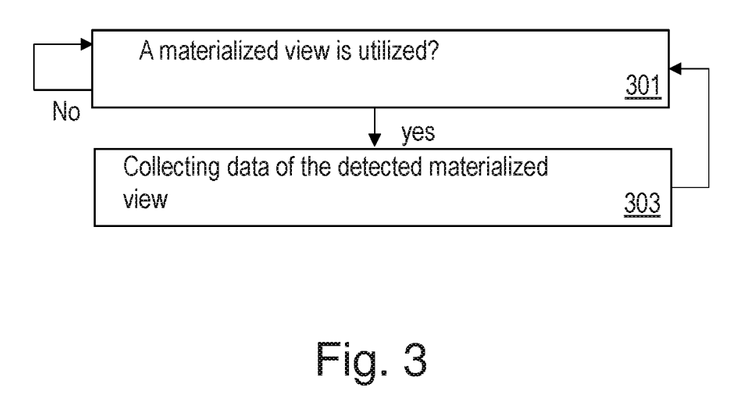
FIG. 3 is a flowchart of a method for monitoring utilization of materialized views in accordance with some embodiments.

FIG. 3 is a flowchart of a method for monitoring utilizations of the set of materialized views 111 in accordance with certain embodiments. For the purpose of explanation, the method described in FIG. 3 may be implemented in the system illustrated in FIG. 1, but it is not limited to this implementation. The method of FIG. 3 may, for example, be performed by the spare host 103. For that, the spare host 103 may comprise a dedicated process that is configured to monitor the utilization of the set of materialized views 111 by checking the execution plan files 117.

In operation 301, it may be detected or determined whether a materialized view of the set of materialized views 111 is utilized. Operation 301 may be referred to as check step or scan step. For example, operation 301 may check whether the materialized views have been utilized in a period of time. In one example, the period of time may be the period between the last execution of the scan step and the current execution of the scan step. In case of a first execution of operation 301, all occurrences of utilizations of the materialized views 111 (e.g., since their creation) may be counted or determined. In case the materialized view 111 is determined to be utilized, data of the utilization of the materialized view 111 may be collected in operation 303 (e.g., in registry 120 or in other storage means such as files).

In the case that nothing is detected in operation 301, operation 301 may be repeated until utilization of a materialized view 111 is detected.

Figure 4:
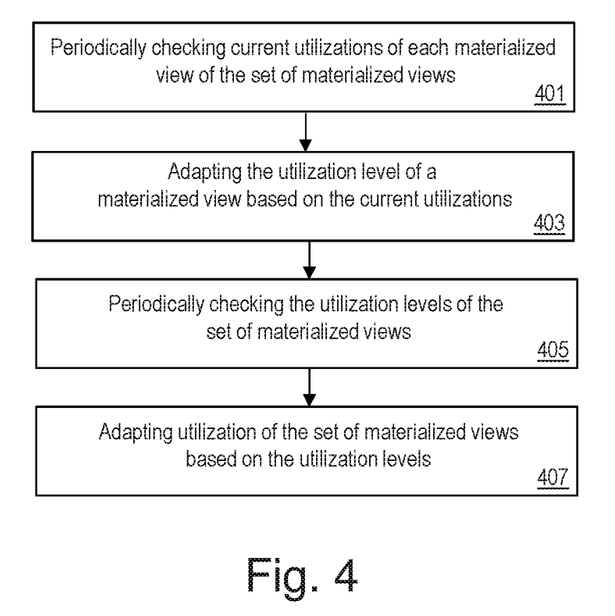
FIG. 4 is a flowchart of a method for controlling utilization of materialized views in accordance with some embodiments.

FIG. 4 is a flowchart of a method for controlling utilization of the set of materialized views 111 in accordance with certain embodiments. Each materialized view of the set of materialized views may be associated with a utilization level indicating the level of utilization of the materialized view in the past. For the purpose of explanation, the method described in FIG. 4 may be implemented in the database system 101 illustrated in FIG. 1, but it is not limited to this implementation. The method of FIG. 4 may, for example, be performed by the materialized view assistant 119 or be performed by the spare host 103 when executing the computer process. For that, the materialized view assistant 119 may have access to the current utilizations of the set of materialized views 111. The current utilizations may, for example, be the utilizations detected and registered in the registry 120 by the spare host in FIG. 3 or may, in another example, be provided by a user of the database system 101.

The materialized view assistant 119 may periodically check in operation 401 the current utilizations of each materialized view of the set of materialized views 111. This may, for example, be performed by reading the current content of the registry 120 that resulted from the method of FIG. 3. In another example, this operation 401 may be performed by prompting a user of the database system 101 for inputs indicating the current utilizations of the set of materialized views 111. The current utilizations of the materialized view 111 may, for example, indicate the time at which the materialized view 111 is used (e.g., in the last day, or last hour).

The materialized view assistant 119 may adapt in operation 403 the utilization level of each materialized view 111 whose current utilizations are determined or detected in operation 401. This adaptation may be performed as described with reference to FIG. 2, operation 209.

The materialized view assistant 119 may periodically check in operation 405 the utilization levels associated with each of the set of materialized views 111. Based on the utilization levels of the set of materialized views 111 determined in operation 405, the utilization of the set of materialized views 111 may be adapted in operation 407 by the materialized view assistant 119. This adaptation may be performed as described with reference to FIG. 2, operation 213.

Figure 5:
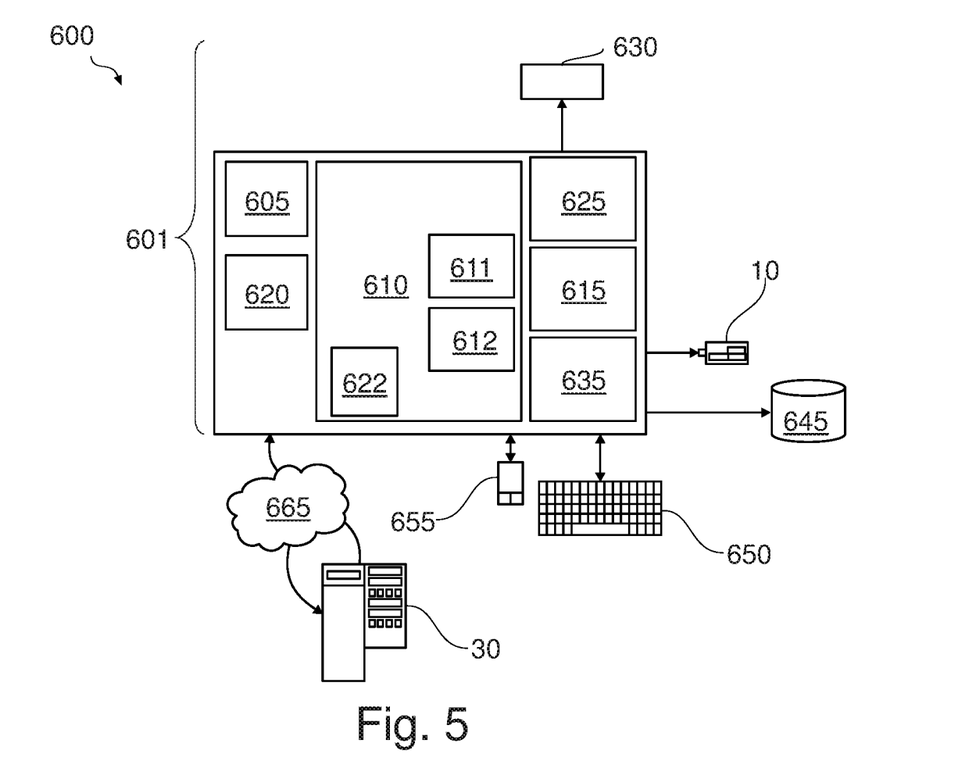
FIG. 5 represents a computerized system, suited for implementing one or more method operation, according to some embodiments.

FIG. 5 represents a general computerized system 600 suited for implementing at least part of method steps/operations as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 5, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this embodiment. In the example of FIG. 5, software in the memory 610 includes instructions (or software 612) e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program (or software 612), executable program (object code), script, or any other entity comprising a set of instructions (or software 612) to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 5, the methods can be stored on any computer readable medium, such as storage 620, for use by or in connection with any computer related system or method. The storage 620 may comprise a disk storage such as HDD storage.

It is to be understood that although this disclosure includes a detailed description on cloud computing, implementation of the teachings recited herein are not limited to a cloud computing environment. Rather, the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
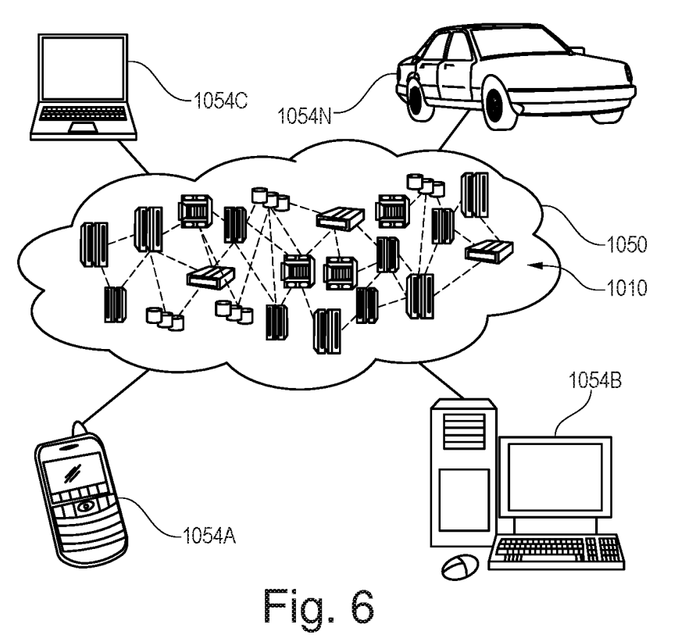
FIG. 6 depicts a cloud computing environment according to some embodiments.

Referring now to FIG. 6, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system MN may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 6 are intended to be illustrative only and that computing nodes 1010 and cloud computing environment 1050 can communicate with any type of computerized device over any type of network and/or network addressable connection (e.g., using a web browser).

Figure 7:
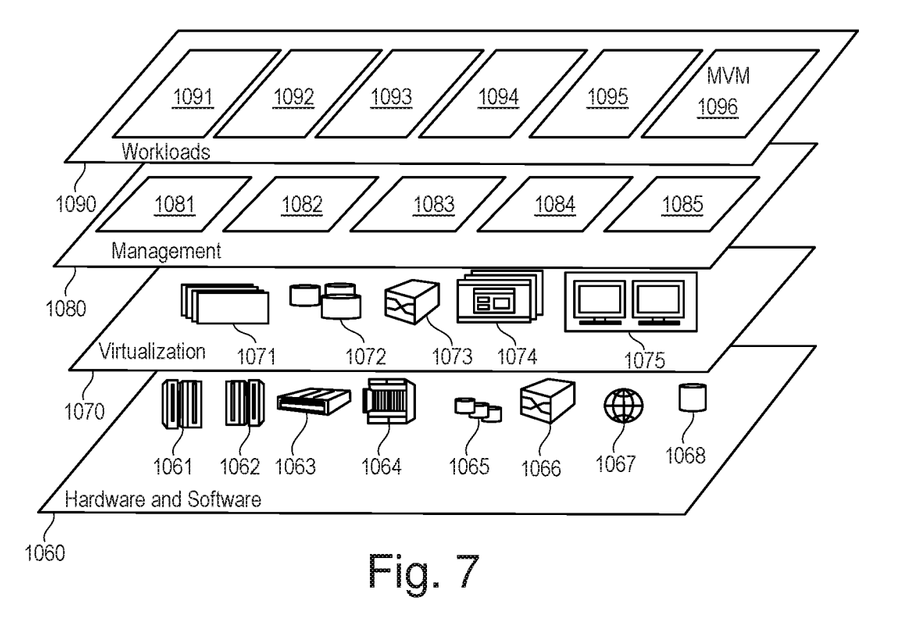
FIG. 7 depicts abstraction model layers according to some embodiments.

Referring now to FIG. 7, a set of functional abstraction layers provided by cloud computing environment 1050 (FIG. 6) is shown. It should be understood in advance that the components, layers, and functions shown in FIG. 7 are intended to be illustrative only and the present embodiments are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and materialized view management (MVM) 1096 in accordance with the present subject matter e.g. as described with reference to FIG. 2, 3 or 4.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a database system comprising a set of materialized views, the method comprising:
   incorporating, by one or more processors, a utilization level field for the set of materialized views in a database catalog of the database system;
   generating, by the one or more processors, a computer process to run during a defined time period on a spare host of the database system, the computer process being configured to monitor utilization of the set of materialized views;
   executing, by the one or more processors, the computer process comprising:
      detecting, by the computer process, utilization of at least one materialized view of the set of materialized views; and
      collecting, by the computer process, data of the detected materialized view in a dedicated registry, the data indicating the detected materialized view and a time of utilization of the materialization view;
   periodically checking, by the one or more processors, if each materialized view of the set of materialized views is present in the registry;
   adapting, by the one or more processors, in the utilization level field, the utilization level of a materialized view based on its collected data in the registry; and
   periodically checking, by the one or more processors, in catalog utilization levels of the set of materialized views, and based on the utilization levels adapting the utilization of the set of materialized views,
   wherein adapting the utilization of the set of materialized views comprises:
      in a case where the utilization level of a materialized view is smaller than a threshold, disabling the materialized view; and
      in a case where the utilization level of a materialized view is higher than a threshold, maintaining the materialized view.

2. The computer-implemented method of claim 1, the utilization level being a number of utilizations.

3. The computer-implemented method of claim 1, wherein the materialized view includes a table that contains a subset of columns of a base table.

4. The computer-implemented method of claim 1, the utilization level being a frequency of utilizations, wherein adapting the utilization of the set of materialized views comprises: determining based on frequency time periods during which the materialized view is to be enabled, and enabling the materialized view only for the time periods.

5. The computer-implemented method of claim 1, wherein adapting the utilization level comprises: increasing the utilization level of a materialized view upon determining that it exists in the registry, otherwise decreasing the utilization level of the materialized view.

6. The computer-implemented method of claim 1, collected data of a detected materialized view further indicating a SQL statement that triggered the utilization of the detected materialized view.

7. The computer-implemented method of claim 6, the collected data comprising a hash generated from the SQL statement.

8. The computer-implemented method of claim 1, wherein each materialized view the set of materialized views is represented by a record in the database catalog, the record comprising values of attributes of the materialized view, the attributes comprising an additional utilization level field.

9. The computer-implemented method of claim 1, wherein the computer process is a daemon process.

10. The computer-implemented method of claim 1, wherein the registry is checked more frequently than the catalog.

11. A computer program product comprising:
   one or more computer readable storage media, and program instructions collectively stored on the one or more computer readable storage media, the program instructions executable by one or more processors to cause the one or more processors to perform actions comprising:
   incorporating, by the one or more processors, a utilization level field for a set of materialized views in a database catalog of a database system;
   generating, by the one or more processors, a computer process to run during a defined time period on a spare host of the database system, the computer process being configured to monitor utilization of the set of materialized views;
   executing, by the one or more processors, the computer process comprising:
   detecting, by the computer process, utilization of at least one materialized view of the set of materialized views; and
   collecting, by the computer process, data of the detected materialized view in a dedicated registry, the data indicating the detected materialized view and a time of utilization of the materialization view;
   periodically checking, by the one or more processors, if each materialized view of the set of materialized views is present in the registry;

adapting, by the one or more processors, in the utilization level field, the utilization level of a materialized view based on its collected data in the registry; and periodically checking, by the one or more processors, in catalog utilization levels of the set of materialized views, and based on the utilization levels adapting the utilization of the set of materialized views, wherein adapting the utilization of the set of materialized views comprises:
  in a case where the utilization level of a materialized view is smaller than a threshold, disabling the materialized view; and
  in a case where the utilization level of a materialized view is higher than a threshold, maintaining the materialized view.

12. The computer program product of claim 11, the utilization level being a number of utilizations.

13. The computer program product of claim 11, wherein the materialized view includes a table that contains a subset of columns of a base table.

14. The computer program product of claim 11, the utilization level being a frequency of utilizations, wherein adapting the utilization of the set of materialized views comprises: determining based on frequency time periods during which the materialized view is to be enabled, and enabling the materialized view only for the time periods.

15. The computer program product of claim 11, wherein adapting the utilization level comprises: increasing the utilization level of a materialized view upon determining that it exists in the registry, otherwise decreasing the utilization level of the materialized view.

16. The computer program product of claim 11, collected data of a detected materialized view further indicating a SQL statement that triggered the utilization of the detected materialized view.

17. The computer program product of claim 16, the collected data comprising a hash generated from the SQL statement.

18. The computer program product of claim 11, wherein each materialized view the set of materialized views is represented by a record in the database catalog, the record comprising values of attributes of the materialized view, the attributes comprising an additional utilization level field.

19. The computer program product of claim 11, wherein the program instructions are provided as a service in a cloud environment.

20. A system comprising:
  one or more computer readable storage media with program instructions collectively stored on the one or more computer readable storage media; and
  one or more processors configured to execute the program instructions to perform a method comprising:
  incorporating a utilization level field for a set of materialized views of database system in a database catalog of the database system;
  generating a computer process to run during a defined time period on a spare host of the database system, the computer process being configured to monitor utilization of the set of materialized views, detect utilization of at least one materialized view of the set of materialized views; and collect data of the detected materialized view in a dedicated registry, the data indicating the detected materialized view and a time of utilization of the materialized view;
  periodically checking if each materialized view of the set of materialized views is present in the registry;
  adapting, in the utilization level field, a utilization level of a materialized view based on its collected data in the registry; and
  periodically checking in catalog utilization levels of the set of materialized views, and based on the utilization levels adapting the utilization of the set of materialized views,
  wherein adapting the utilization of the set of materialized views comprises:
    in a case where the utilization level of a materialized view is smaller than a threshold, disabling the materialized view; and
    in a case where the utilization level of a materialized view is higher than a threshold, maintaining the materialized view.

* * * * *